United States Patent [19]

Crawford

[11] 4,005,968
[45] Feb. 1, 1977

[54] PIPE END REFORMING APPARATUS

[75] Inventor: William V. Crawford, Williamstown, Ky.

[73] Assignee: Phillips Petroleum Company, Bartlesville, Okla.

[22] Filed: May 19, 1975

[21] Appl. No.: 578,962

[52] U.S. Cl. .............................. 425/384; 264/318; 425/392; 425/DIG. 218
[51] Int. Cl.² ...................... B29C 3/00; B29C 17/00
[58] Field of Search ......... 425/DIG. 218, 393, 392, 425/DIG. 14, 384, 394, 438; 264/318; 72/393

[56] References Cited
UNITED STATES PATENTS

| | | | |
|---|---|---|---|
| 3,884,612 | 5/1975 | Parmann | 425/384 |
| 3,910,744 | 10/1975 | Ronden et al. | 425/393 |
| 3,932,094 | 1/1976 | Korff et al. | 425/DIG. 218 |

Primary Examiner—Francis S. Husar
Assistant Examiner—R. J. Charvat

[57] ABSTRACT

An apparatus for reforming pipe ends by belling or the like. The apparatus includes a support structure which has a heater movably mounted thereon and is movable between a pipe end heating position and a second position remote from the heating position. A clamp is provided to hold the pipe in position during heating and forming. A forming mandrel is carried by power operated moving means which selectively moves the mandrel into forming engagement with an end portion of the pipe and after forming of the end portion the mandrel is retracted from engagement therewith. Cooling means are also provided to cool the formed pipe end portion.

7 Claims, 7 Drawing Figures

PIPE END REFORMING APPARATUS

It is oftentimes desired to bell or otherwise form the end of a piece of plastic pipe so that same can be used to join fittings or to join one piece of plastic pipe to an adjacent piece of plastic pipe. In the past, belling has been accomplished by first heating an end portion of the plastic pipe such as by immersing same in heated ethylene glycol after which the pipe is moved to a forming means and the end is suitably formed. Such methods have posed problems and difficulties in that it required excessive operator time to perform the forming operation and posed difficulty in the handling of the pipe. This method is particularly disadvantageous when elongate sections of pipe as, for example, 40 foot in length and larger diameter pipes, say from 2 inches to 6 inches in diameter. Old methods and apparatus required extensive operator handling and manipulation of the pipe and the forming apparatus. Also, when ethylene glycol or any other liquid was used to heat the end portion of the pipe, the pipe had to be moved to a substantially vertical position to immerse the end portion in the heated liquid. After heating, the pipe then had to be moved to a forming apparatus which took time and thereby allow the heated end portion to cool which resulted in inconsistently belled end portions of the pipe as the temperature of same varied depending upon the amount of time required for moving the pipe and clamping same into the forming apparatus. The present apparatus is adapted to handle in one structure all of the different mechanisms required to bell the end portion of a piece of pipe.

The principal objects and advantages of the present invention are: to provide an apparatus for belling or otherwise forming an end portion of a pipe which overcomes the above-mentioned difficulties; to provide such an apparatus wherein the different phases of the forming operation are conducted on one apparatus; to provide such an apparatus which is adapted for forming the end portions on both short sections of pipe and long lengths of pipe; to provide such an apparatus which has a movable heating head so that the pipe once positioned need not be moved until the forming operation is completed; to provide such an apparatus which incorporates cooling means to quickly cool the end portion of the pipe after same is formed wherein the cooling is conducted while the forming mandrel is in engagement with the end portion of the pipe to provide more uniform formed end portions; to provide such an apparatus which is adapted for forming different diameter pieces of pipe wherein a minimum amount of effort is required to change the apparatus from forming one size of pipe to another size of pipe; and to provide such an apparatus which is well adapted for its intended use, economical in operation and simple in construction.

Other objects and advantages of the present invention will become apparent from the following description taken in connection with the accompanying drawings wherein are set forth by way of illustration and example certain embodiments of the present invention.

Figure 1:
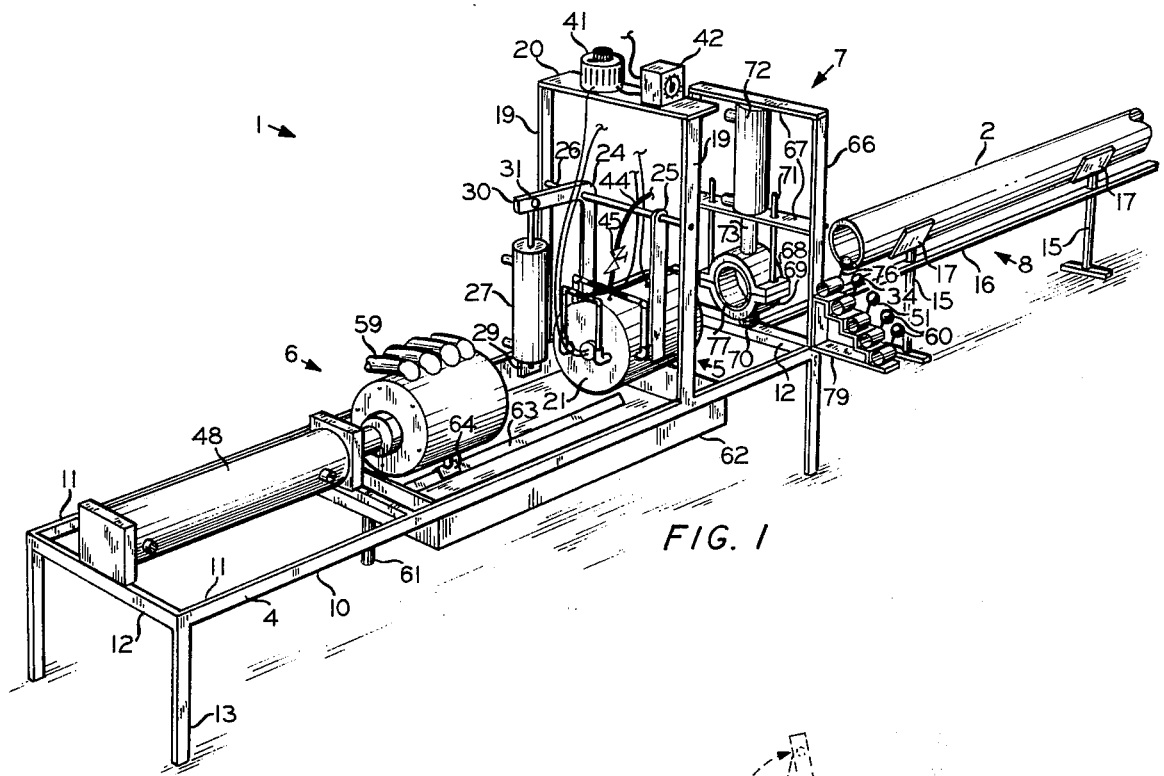
FIG. 1 is a perspective view of a pipe end reforming apparatus.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

The reference numeral 1 designates generally an apparatus for forming or reforming end portions of piece of pipe 2 such as an elongate piece of plastic pipe. The apparatus 1 includes a support structure or frame 4 which has mounted thereon heating means 5 adapted for heating an end portion of the pipe 2. Also mounted on the support 4 is forming means 6 which is adapted to form a softened end portion of the pipe 2. Clamp means 7 are also provided to retain the pipe 2 against movement during the heating and forming operations. Pipe support means 8 cooperate with other portions of the apparatus 1 to support the pipe 2 during the forming operation with the pipe support means 8 also helping to align the pipe for inserting same into the clamp means 7.

In the illustrated structure, the support structure 4 can be of any suitable type and, as shown, includes a generally horizontally disposed frame 10 comprised of side members 11 and a plurality of cross braces 12. Legs 13 are secured to the frame 10 and support same in spaced relation from a floor or the like. Preferably, the pipe support means are secured to the frame 10 and comprise a plurality of upstanding legs 15 adapted for supporting engagement with the floor and have an elongate beam 16 secured thereto and to a portion of the frame 10. Pipe engaging supports 17 are suitably secured to the beam 16 and are adapted for supporting engagement of the pipe 2. Preferably, the supports 17 are V-shaped and are upwardly opening to support the pipe 2 and align same with other portions of the apparatus 1, as more fully described below.

Figure 2:
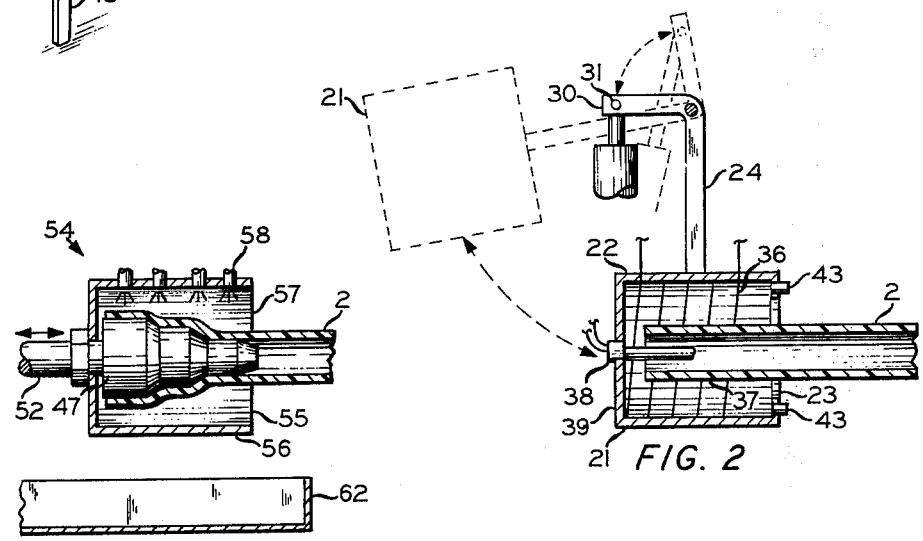
FIG. 2 is an enlarged fragmentary sectional view of the apparatus illustrated in FIG. 1 showing details of the heating head.
Figure 7:
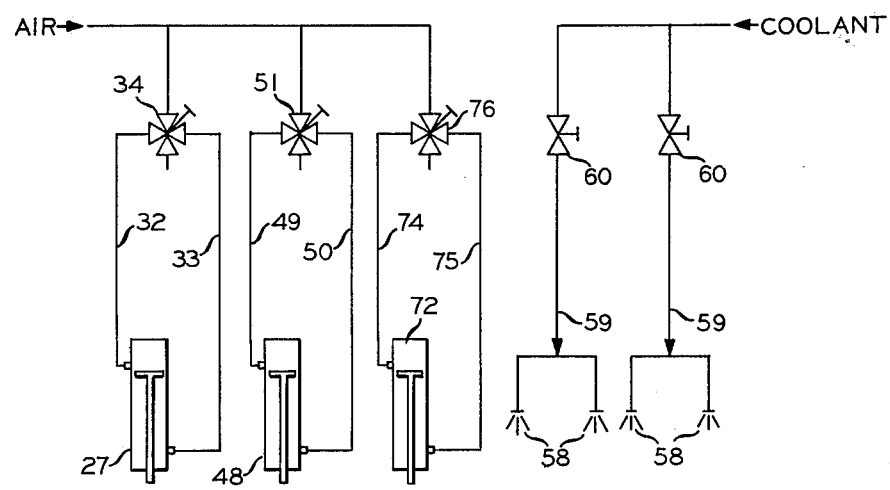
FIG. 7 is a schematic illustration of the air supply system and coolant supply system.

The heating means 5 is suitably mounted on the support structure 4 and, as shown, two generally upstanding structural members 19 are secured to opposite sides of the frame 10 and have a cross member 20 secured therebetween forming a rigid support. The heating means 5 includes a heating head 21 which is comprised of a housing 22 having an open end 23 which in one position as described below faces generally toward the pipe support means 8. As shown, a pair of arms 24 and 25 are suitably secured to the housing 22 and are pivotably mounted on a bearing rod or bar 26 which, in the illustrated structure, is secured to the members 19. The heating head 21 is thereby movable between a first position facing generally toward the pipe support means 8 as shown in FIG. 1 for surrounding and heating of an end portion of the pipe 2 and a second position remote from the first position as shown in FIG. 2. Suitable means are provided for effecting the movement of the heating head 21 between the two positions and, as shown, an extendable ram 27 has one end pivotally mounted on the frame 10 as at 29 and has the rod end pivotally secured to a portion 30 of the arm 24 as at 31. Extension of the ram 27 effects swinging or pivoting movement of the arms 24 and 25 and thereby movement of the heating head 21 between its first and second positions. The ram 27 preferably is an air cylinder and is suitably connected to a source of pressurized air as by conduits 32 and 33 with extension and retraction of the ram 27 being controlled by a suitable valve 34 shown schematically in FIG. 7.

At least one heating element is mounted in the interior of the housing 22 and preferably is of an electric type and, as shown, includes a helically-shaped heating element 36 which is connected to a suitable source of electricity with the heater 36 extending substantially the length of the housing 22 to provide uniform heating along and around the periphery of an end portion 37 (not shown) of the pipe 2. It is to be noted that the heater 36 can be connected to means for controlling the temperature thereof. Preferably, the heating head 21 is also provided with an elongate, electrically operated cartridge-type heater 38 which is mounted on an end wall 39 of the housing 22 and is generally centrally located within the housing and in operation extends into the interior of the end portion 37. The heater 38 is suitably connected to an electric power source and, as shown, has means cooperating therewith such as a Powerstat type variable resistor 41 to control the temperature of same. A timer 42 is provided, in the illustrated structure, and is operable to give warning such as by actuation of a light or buzzer to signal the operator when the heating is completed.

To further enhance the heating of the end portion of the pipe, the heating head 21 is provided with means which communicate with the interior of housing 22 for forcing circulation of air within the housing 22 and, as shown, a plurality of air nozzles 43 open into the housing 22 at various positions to effect circulation of air and more uniform heating of the end portion 37. The nozzles 43 are connected to a suitable source of air as by a conduit 44 which has a flow control valve 45 therein.

In the illustrated structure, the forming means 6 includes power operated means for moving a mandrel 47 into forming engagement with the end portion 37 and then retract the mandrel 47 from the forming engagement. Any suitable type of device can be used and, as shown, same includes a linear movement device such as an extendable ram 48 which is suitably secured to the frame 10. The ram 48 is connected to a source of pressurized fluid such as air as by conduits 49 and 50 and has a suitable control valve 51 to selectively control operation of the ram 48. The mandrel 47 is suitably mounted on the moving rod portion 52 of the ram 48 with the mandrel 47 and rod 52 moving in a direction axially along the longitudinal axis of the pipe 2 when same is in position in the apparatus 1. The mandrel 47 can be of any suitable shape and size and, as shown, is a three-step mandrel for forming two expanded diametral portions on the end portion 37.

Figure 5:
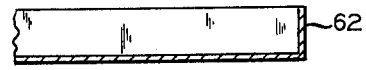
FIG. 5 is an enlarged fragmentary sectional view of a portion of the apparatus shown in FIG. 1 showing details of the forming mandrel and cooling head.
Figure 4:
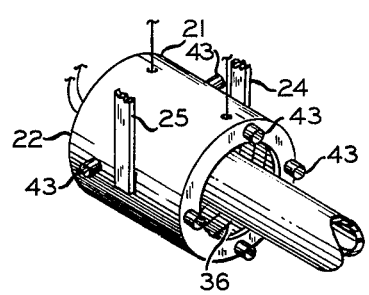
FIG. 4 is another enlarged fragmentary perspective view of the heating head.
Figure 3:
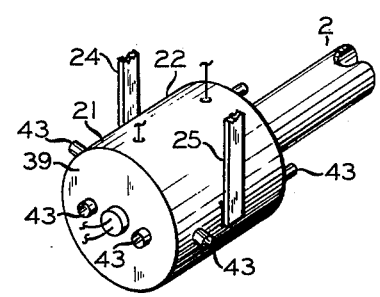
FIG. 3 is an enlarged fragmentary perspective view of the heating head.
Figure 6:
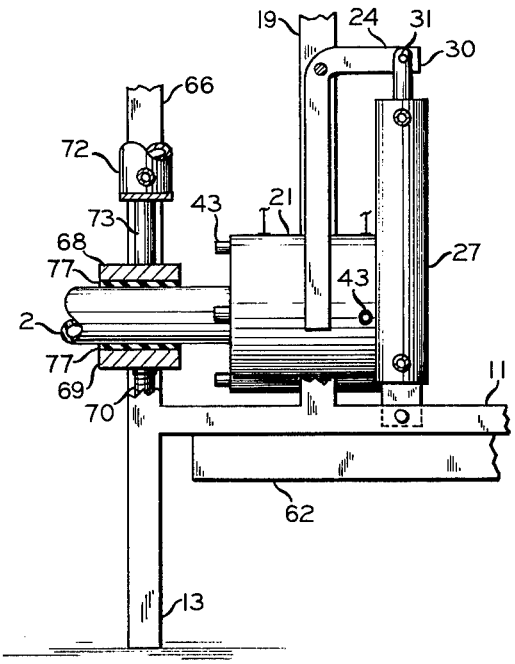
FIG. 6 is an enlarged fragmentary side-elevational view of portions of the apparatus shown in FIG. 1 showing details of a pipe clamp and heating head.

Preferably, cooling means 54 are provided to effect quick cooling of the end portion 37 after same is formed. Any suitable cooling means can be used and as shown, the cooling means 54 includes a cooling head 55 which is comprised of a housing 56 with the cooling head 55 being suitably mounted on and carried by the rod 52 and partially surrounds the mandrel 47. The housing 56 has an open end 57 facing generally toward the pipe 2 for the end portion 37 to pass through. As shown, spray nozzles 58 are mounted on the housing 56 and are directed generally toward the mandrel 47 and can be of any suitable number and positioned at any suitable position on the housing 56. The nozzles 58 are connected to a source of coolant as by conduits 59 with the conduits 59 being provided with flow control valves 60. Coolant such as water is sprayed through the nozzles 58 and onto a formed end portion 37 as best seen in FIG. 5 to effect cooling thereof. The sprayed coolant preferably is collected in means such as a pan or tray 62 positioned below the cooling head 55 with the tray 62 being suitably secured to the frame 10. The tray 62 has a length sufficient to be underneath the open end 57 throughout the entire movement of the cooling head 55. A drain 61 is provided for the tray 62 to allow draining of the collected coolant from the tray 62.

Means are provided in the illustrated structure to help support the weight of the cooling head 55 and the mandrel 47 and to help guide same into alignment with the end portion 37. As shown, a guide or way 63 is secured to the bottom portion of the tray 62 and a bearing follower 64 is secured to the cooling head 55 and is in engagement with the guide 63 to help support the weight and guide the cooling head 55 during movement of same between its extended position and retracted position.

The clamp means 7 are mounted on the frame 10 and are adapted for holding or retaining the pipe 2 against movement during the forming operations. As shown, a pair of upright members 66 are secured to the frame 10 and cross braces 67 are secured between the members 66 to form a rigid clamp support structure. In the illustrated structure the clamp is comprised of two clamp halves, 68 and 69, which are separable to provide clearance for the pipe 2 to be inserted between the two halves. As shown, the clamp half 69 is mounted on a brace 12 as by a threaded member 70 to provide adjustment of same to center the clamp with the heating head 21. Guide rods 71 are secured to flange portions of the clamp half 69 and are slidably received through bearings in flange portions of the clamp half 68 to maintain orientation of the two clamp halves 68 and 69 during operation. The guide rods 71 are provided with substantially rigid support by engagement with a brace 67. Means are provided to effect movement of the clamp halves relative to one another and, as shown, an extendable ram 72 is secured to the braces 67 with the movable rod 73 having the clamp half 68 mounted thereon whereby extension and retraction of the ram 72 effects movement of the clamp half 68 relative to the clamp half 69. The ram 72 is preferably an air cylinder and is connected to a suitable source of air as by conduits 74 and 75 with a control valve 76 to control selective operation of the ram 72. Preferably, the inside surfaces of the clamp halves 68 and 69 have a lining 77 of a resilient material such as rubber to provide a firm grip with the pipe 2 and to reduce marring and deforming of the pipe 2.

To facilitate operation of the apparatus 1 by an operator, the valves 34, 51, 76 and 60 are mounted on a portion of the support 4 as on a bracket 79 at a position convenient for the operator as, for example, adjacent to the clamp means 7. Valves 34, 51, and 76 can be lever operated four-way valves for the operation of rams 27, 48, and 72 which can be double acting air cylinders. For clarity, the conduits for the valves 34, 51, 76 and 60 are not shown in FIG. 1 but are shown schematically in FIG. 7.

The present invention is more fully understood by a description of the operation thereof. At the start of the operating sequence, the heater head 21 is in the up position, heaters 36 and 38 are activated, air is circulating through nozzles 43, ram 38 is retracted, coolant valves 60 are closed, and clamp means 7 are open. An elongate piece of pipe or tubing is positioned on the supports 17 by the operator. The pipe 2 is moved forward so that the end to be formed is correctly positioned relative to the down position of heating head 21 which can be accomplished by providing a stop (not shown) on the apparatus 1 or by measurement of the pipe and positioning same relative to a fixed point on the apparatus 1. After the positioning is accomplished, the clamp means 7 are actuated to firmly grip the pipe 2 between the clamp halves 68 and 69. The heating head 21 is then moved from its up position as seen in broken lines in FIG. 2 to its heating position also seen in FIG. 2. The timer 42 is actuated by the operator and after a predetermined time as determined and shown by the timer 42 which will warn the operator such as by actuation of a light or a buzzer. It is to be noted that the mandrel 47, heating head 21 (when in the heating position) and the clamp are in axial alignment with the longitudinal axis of the pipe 2 when same is supported by the support means 8. After the proper heating time has elapsed, the operator then actuates the valve 34 to effect movement of the heating head 21 upwardly and out of its position for heating the end portion 37. After the heating head 21 is moved upwardly, the valve 51 is actuated so as to effect extension of the ram 48 to move the mandrel 47 into forming engagement with end portion 37 as shown in FIG. 5. Preferably, the forming position of the mandrel is determined by the stroke of the ram 48. After a short cooling time in air, the coolant valves 60 are then opened to spray coolant such as water onto the end portion 37 continuously for a predetermined time. After the predetermined amount of time, the ram 48 is retracted to move the mandrel 47 out of forming engagement with end portion 37. With the forming operation complete, the valve 76 is actuated so as to release the clamping engagement of the clamp halves 68 and 69 by retraction of the ram 72. The pipe 2 can then be removed from the apparatus 1 and another pipe placed in position for repeating the above operation to form another pipe end portion. The coolant flow can be controlled by the valves 60 to control the rate of cooling of the end portion 37. It is to be noted that with the apparatus as described and shown either elongate or short sections of pipe 2 can be easily formed by one operator with a minimum amount of effort on his part. It is to be further noted that the apparatus 1 can be provided with means such as timers, cam controls or switches to make the operation thereof automatic.

It should be understood that the heating and cooling times will vary depending on the types of plastic such as polyvinyl chloride, polyethylene, polypropylene and the like, pipe diameter, and wall thickness of the pipe to be formed. Different pipe diameters can be accommodated by changing mandrel 47 and clamp halves 68 and 69.

In a specific example: Six inch nominal diameter high density polyethylene pipe was cut to 38'-8'' long (12 meters, 3 centimeters), the Powerstat or variable resistor 41 was set to heat the pipe to 240° F (114° C). The pipe was placed in the clamp and was heated for 1 minute, 10 seconds, cooling time was one minute without water and one and ½ minutes with water.

It is to be understood that while I have illustrated and described certain forms of my invention, it is not to be limited to the specific form or arrangement of parts herein described and shown.

I claim:

1. A pipe end reforming apparatus comprising:
   a. a support;
   b. a mandrel;
   c. first means movably mounting said mandrel on said support with said mandrel being movable in a generally linear path between a retracted position and a forming position for engagement with an end portion of a pipe;
   d. clamp means mounted on said support and adapted for selectively holding a pipe in a preselected position;
   e. heating means; and
   f. second means movably mounting said heating means on said support with said heating means being movable, independently of said mandrel, in an arcuate path between a first position and a second position, when in said second position said heating means being in heat transfer relation to an end portion of a pipe and being in axial alignment with said clamp means and said mandrel and when in said first position said heating means being out of axial alignment with said mandrel and the pipe thereby providing clearance for said mandrel to move to the forming position whereby heating and forming can be accomplished without moving said pipe.

2. The apparatus as set forth in claim 1 including:
   a. cooling means adjacent said mandrel and movable therewith for cooling the end portion of said pipe; and wherein
   b. said heating means is positioned in the second position so as to substantially surround the periphery of the end portion.

3. The apparatus as set forth in claim 2 wherein:
   a. said second means includes an arm on which said heating means is mounted and the arm is pivotably mounted on portions of said support; and
   b. said second means further includes first power means operably connected to said arm to selectively effect movement of said heating means between said first and second positions.

4. The apparatus as set forth in claim 2 wherein:
   a. said first means includes second power means mounted on said support and having said mandrel mounted on a portion thereof to selectively effect the movement of said mandrel between the retracted position and the forming position; and wherein
   b. said cooling means is carried by portions of said second power means.

5. The apparatus as set forth in claim 2 wherein:
   a. said cooling means includes a housing having an open end and partially surrounding said mandrel, a plurality of spray nozzles are mounted on said housing and are directed generally toward said mandrel for directing a cooling fluid toward same to effect cooling of the end portion; and including b. third means associated with said spray nozzles and housing for collecting sprayed cooling fluid.

6. The apparatus as set forth in claim 2 wherein:

a. said heating means includes at least one heater element mounted in a second housing which is secured to said arm, said second housing having an open end for receiving the end portion therein, air circulation inducing means communicate with the interior of the second housing.

7. The apparatus as set forth in claim 6 wherein:

a. said heater element is an electric heating element; and b. said heating means includes a second electric heating element mounted in said housing and centrally located to be received inside the end portion.

* * * * *